(12) United States Patent
Billington et al.

(10) Patent No.: US 6,177,886 B1
(45) Date of Patent: Jan. 23, 2001

(54) METHODS AND SYSTEMS OF MONITORING TRAFFIC FLOW

(75) Inventors: Peter Eric Billington, Sheffield; Christopher Michael Barnes, Lincoln; Jonathan Paul Wakefield, Huddersfield, all of (GB)

(73) Assignee: Trafficmaster PLC, Buckinghamshire (GB)

( * ) Notice: Under 35 U.S.C. 154(b), the term of this patent shall be extended for 0 days.

(21) Appl. No.: 09/367,212

(22) PCT Filed: Feb. 12, 1998

(86) PCT No.: PCT/GB98/00402

§ 371 Date: Oct. 12, 1999

§ 102(e) Date: Oct. 12, 1999

(87) PCT Pub. No.: WO98/36398

PCT Pub. Date: Aug. 20, 1998

(30) Foreign Application Priority Data

Feb. 12, 1997 (GB) .................................................. 9702849

(51) Int. Cl.[7] .................................................. G08G 1/065
(52) U.S. Cl. .......................... 340/934; 340/910; 340/933; 701/118
(58) Field of Search .................................... 340/934, 910, 340/915, 933, 935, 936, 937, 905; 701/118, 119

(56) References Cited

U.S. PATENT DOCUMENTS

| 4,258,351 | * | 3/1981 | Shigeta et al. | 340/556 |
|---|---|---|---|---|
| 5,296,852 | * | 3/1994 | Rathi | 340/933 |
| 5,416,711 | * | 5/1995 | Gran et al. | 364/436 |
| 5,638,302 |  | 6/1997 | Gerber | 364/556 |
| 5,651,075 | * | 7/1997 | Frazier et al. | 382/105 |
| 5,696,503 | * | 12/1997 | Nasburg | 340/933 |
| 5,793,491 | * | 8/1998 | Wangler et al. | 356/376 |

FOREIGN PATENT DOCUMENTS

| 33 27 706 | 2/1985 | (DE) . |
| 494815 | 7/1992 | (EP) . |
| WO93 19441 | 9/1993 | (WO) . |

* cited by examiner

Primary Examiner—Daniel J. Wu
Assistant Examiner—Toan Pham
(74) Attorney, Agent, or Firm—William D. Hall

(57) ABSTRACT

A method of monitoring traffic flow comprises reading registration plates of the vehicles of a multiplicity of series of vehicles passing respective locations on a road network, if necessary selecting samples of readings from the readings relating to the vehicles of the series, and determining whether readings of the samples are deemed to contain matching readings. The samples are used as probes or targets to measure average journey times which are compared with reference journey times. The selecting of the samples at the respective reading locations is performed according to an algorithm common to all of the locations.

24 Claims, 2 Drawing Sheets

METHODS AND SYSTEMS OF MONITORING TRAFFIC FLOW

FIELD OF THE INVENTION

This invention relates to a method and a system involving registration plates of vehicles, and to a method of transmitting data.

BACKGROUND OF THE INVENTION

WO90/05969 discloses a traffic congestion monitoring system comprising infra-red monitoring units bolted to the sides of bridges over a motorway network and emitting information as to traffic congestion at their locations, a control centre which receives and transmits the information, and paging units in respective vehicles and receiving the information and visually displaying the same upon diagrams of the network or zones thereof.

The infra-red monitoring units in effect look at one location underneath a bridge or gantry to measure the average speed. Of course this works well on motorways and dual carriageway standard trunk roads where there is a continual flow of traffic. However, unless these units are put very close together (300–500 meters), they are an inaccurate way of measuring average speed or journey time on roads where there are traffic flow interruptions caused by traffic lights, roundabouts and other obstacles.

Vehicle licence-plate reading systems are known but these have been designed for law enforcement purposes, tolling and entry control for car parks, for example. These systems require a very high degree of accuracy as clearly if a licence-plate is misread it may not allow access through a barrier, or if used for enforcement cannot be legally enforceable. Because of this general requirement for a very high degree of accuracy, hardware platforms for reading licence-plates are very expensive and the data content and thus cost that would be required to communicate these licence-plates over a radio link would be very high because of the detail involved.

SUMMARY OF THE INVENTION

According to a first aspect of the present invention, there is provided a method of monitoring traffic flow, comprising reading registration plates of the vehicles of a first series of vehicles passing a first location along a road, selecting a sample of readings from the readings relating to the respective vehicles of the series, reading the registration plates of the vehicles of a second series of vehicles passing a second location along said road, and determining whether readings of said sample are deemed to be present in the readings relating to the respective vehicles of said second series.

According to a second aspect of the present invention, there is provided a system for monitoring traffic flow, comprising first reading means serving to read registration plates of the vehicles of a first series of vehicles passing a first location along a road, second reading means serving to read registration plates of the vehicles of a second series of vehicles passing a second location along said road, and selecting and determining means serving to select a sample of readings from the readings relating to the respective vehicles of said first series and serving to determine whether readings of said sample are deemed to be present in the readings relating to the respective vehicles of said second series.

According to a third aspect of the present invention, there is provided a method of reading a registration plate of a vehicle, in which characters between the leading character and the trailing character of the registration plate are reported, but the leading character and/or the trailing character is/are not reported.

According to a fourth aspect of the present invention, there is provided a method of reading a registration plate of a vehicle, in which characters, of the plate having a statistical distribution more even than at least another character of the plate are reported and the or each said other character is not reported.

According to a fifth aspect of the present invention, there is provided a method of reading a registration plate of a vehicle, comprising reading a character of said plate, and reporting said character as being one of a restricted group of characters.

According to a sixth aspect of the present invention, there is provided a method of transmitting data comprising transmitting a progressively changing value as a sequence of signals by which differences of magnitude, but not actual magnitudes, are communicated.

Owing to these aspects of the invention, it is possible to reduce the amount of data to be handled and consequently the complexity of the hardware and software is reduced and thus the cost of handling the same is reduced.

It is preferred to employ a character recognition system, for example a per se known system supplied by Racal, to read the whole of the registration plate. There is, however, an alternative way of doing this, and that is to interpret the characters—the letters and numerals—on the registration plate not as a collection of individual characters that actually have to be interpreted and identified as such but simply as a pattern which merely has to be stored and then compared with other patterns of the same type subsequently acquired by the system. Thus, according to an alternative aspect of the invention, there is provided a vehicle registration plate reading method in which all or some of the characters of the registration plate are scanned to derive a pattern image thereof, and this pattern is used as such in subsequent comparison and vehicle identification stages of the method.

Advantageously, the registration plate is irradiated with radiation which is invisible to the human naked eye and the radiation reflected from the plate is utilised in performing the reading.

It is thus possible to read-vehicle plates during both daylight and darkness and without distracting drivers of the vehicles.

The invisible radiation employed is preferably infra-red (IR), particularly laser IR, since an IR laser can produce a higher intensity of irradiation than conventional IR sources.

In a preferred embodiment of the invention, a small sample of vehicles is used as probes or targets passing two or more fixed points along the road to measure the average journey time. A series of vehicles is identified and recorded by means of a closed circuit television (CCTV) camera and computer at a fixed point and then, after converting this data into a format that can be transmitted by means of a radio link, the vehicles are identified again at a second fixed point and the two sightings matched up. The average time for a sample of vehicles to travel between the two fixed points is compared with the expected or usual average journey time for that stretch of road. The comparison of journey time(s) is particularly appropriate for roads where there may not be a constant flow of traffic, but rather interruptions by traffic lights or roundabouts for example.

The identification of the vehicles in the sample is by matching two registration plates between the first and second fixed points but need not be a definitive reading of the whole registration plate and matching this with official data records.

The preferred system includes a low-cost hardware platform using infra-red CCTV cameras and laser infra-red illumination which are cheap to install. It reads the registration plate and uses some of the characters thereof to create a vehicle tag, which might be as little as two bytes, which is later transmitted over a radio link either to an adjacent reading location or to a remote control centre. Tags from a second reading location are compared with the transmitted tag. The software which carries out this function can operate on a low cost personal computer (PC) processor and can reliably match two or more sightings of the same vehicle.

In the preferred embodiment, the selecting of the samples at the respective reading locations is performed on a road network according to an algorithm common to all of the locations. The use of an algorithm increases the possibility of a match because of the use of intelligent selection of the sample rather than random selection. The algorithm comprises the step of excluding readings below a confidence factor threshold. Characters between the leading character and the trailing character of each registration plate are reported prior to the selecting, but the leading character and the trailing character are not reported. Nevertheless, all of the characters of each registration plate are read prior to the reporting. Characters of each plate having a statistical distribution more even than at least another character of the plate are reported prior to the selecting and the or each such other character is not reported. Such other character may be a dating character, in the United Kingdom, or a geographically locating character, in France for example. Reading comprises reading each character of each plate, and reporting, prior to the selecting, each such character as being one of a restricted group of characters, which is itself one of a plurality of restricted groups of characters, the characters whereof differ from group-to-group and from character-to-character in each group. The characters of the restricted groups are letters of the alphabet, and may comprise respectively:

LBSQ
EFPAR
IJKX
CODGU
NZHM
VWTY

The readings obtained from the or each series of vehicles are each entered into an appropriate time period of a sequence of time periods and a signal is emitted representing readings relating to vehicles of that series, which signal comprises codes representing time period differences among readings, and the vehicle tags.

BRIEF DESCRIPTION OF THE DRAWINGS

In order that the invention may be clearly understood and readily carried into effect, reference will now be made, by way of example, to the accompanying drawings, in which:—

DESCRIPTION OF THE PREFERRED EMBODIMENT

Figure 1:
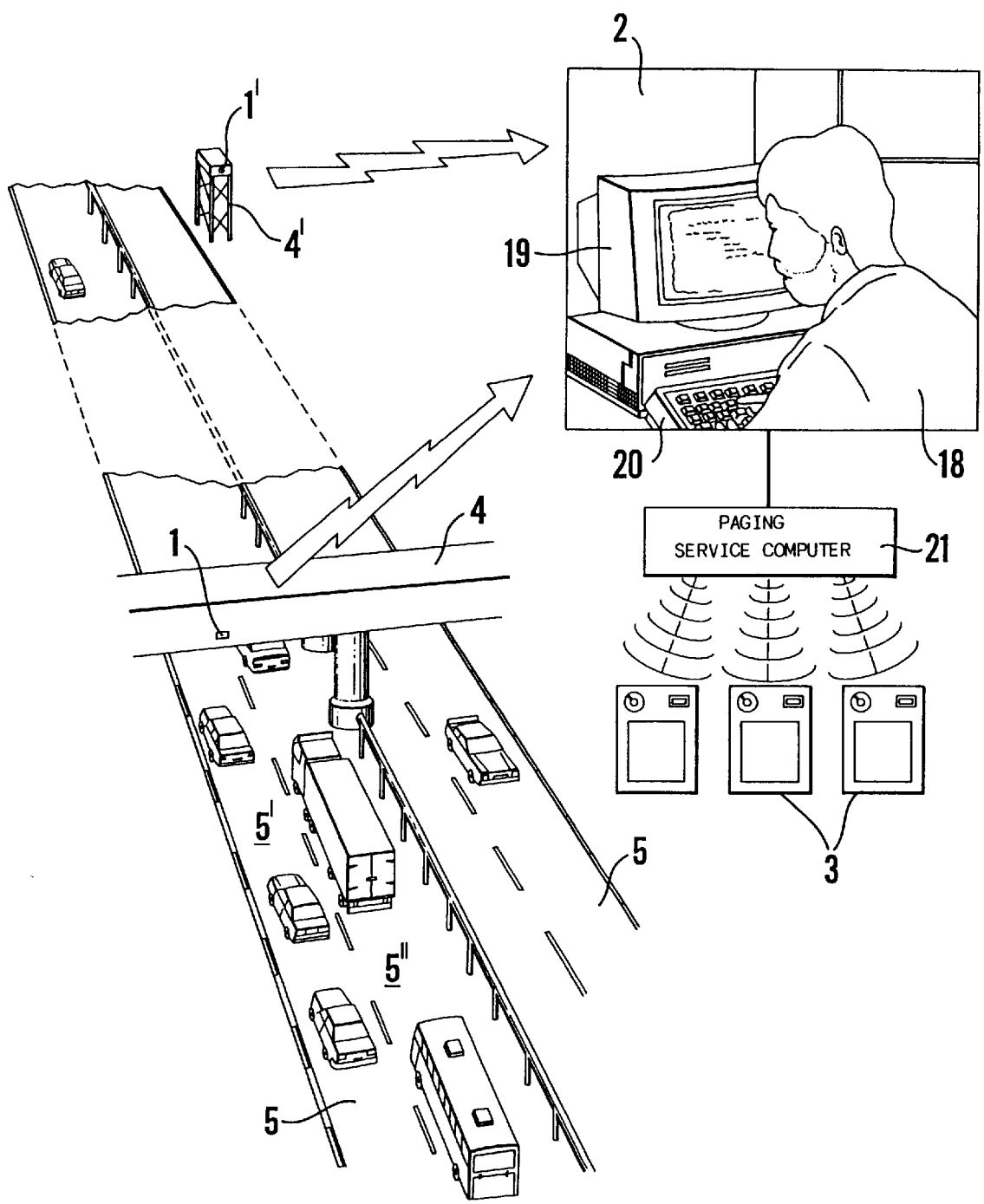
FIG. 1 shows diagrammatically a traffic congestion monitoring system.
Figure 2:
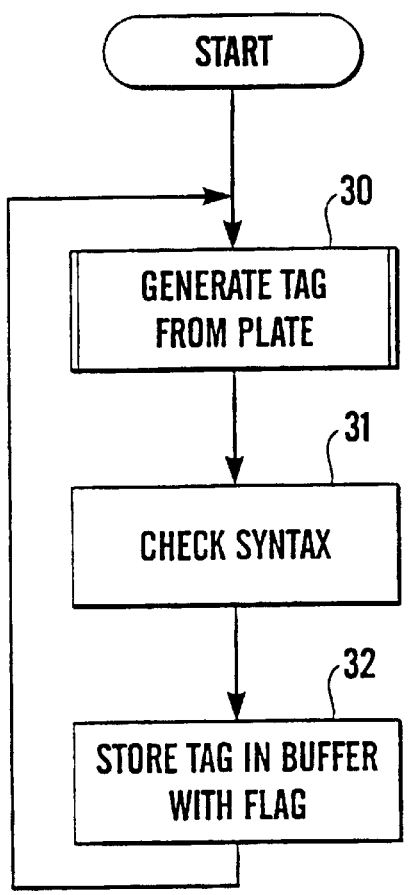
FIG. 2 shows a flow diagram for a part of the system.
Figure 3:
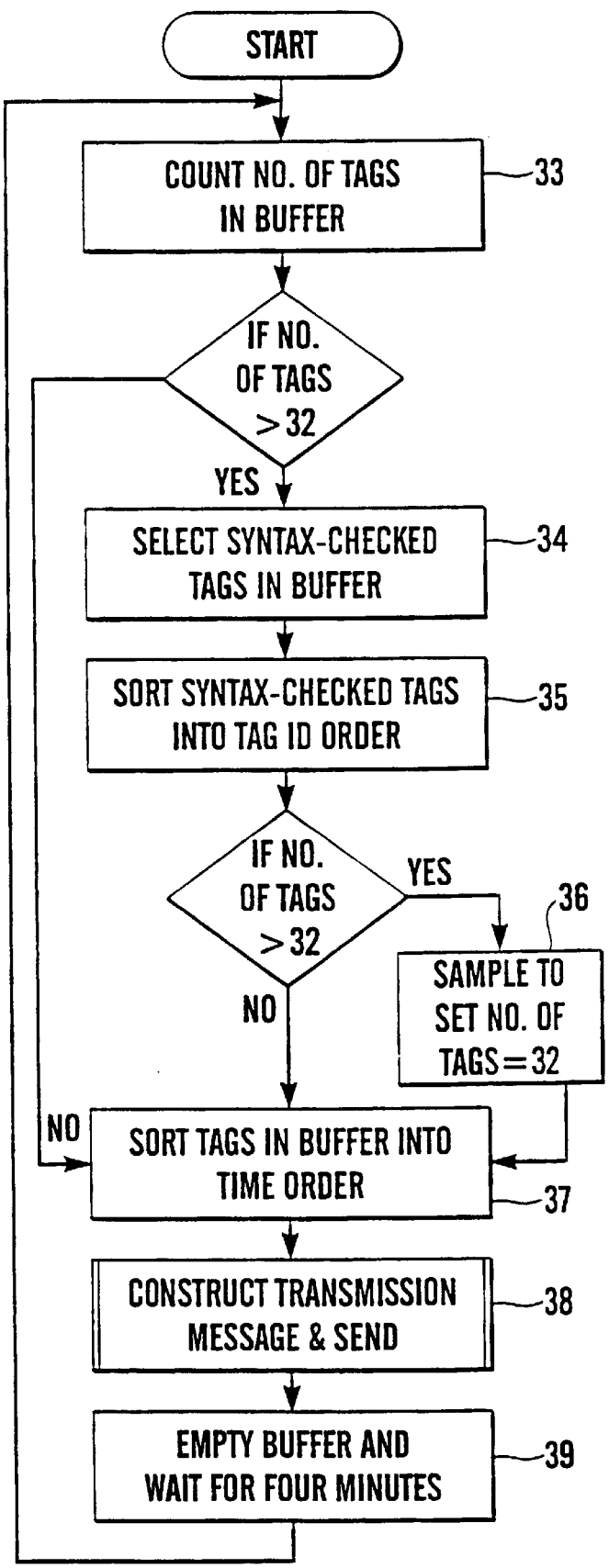
FIG. 3 shows a flow diagram for another part of the system.

Respective monitoring units 1 are mounted on the sides of bridges 4 (or gantries) over each carriageway 5 (or upon poles 4' beside such carriageway) of a road, or of each road of a network of roads, which has obstacles, for example traffic-lights and roundabouts. Each unit 1 includes an IR laser which irradiates the front registration plates of approaching vehicles in one of the lanes 5' or 5" of each carriageway 5. Each unit 1 further includes an IR CCTV camera which reads all of the characters of the irradiated plates. From the characters of each plate, a vehicle tag is generated as indicated at 30 in FIG. 2. The syntax of each plate is checked as indicated at 31. A confidence factor is generated for each tag and the tags are stored in a buffer, with those plates with good syntax flagged, as indicated at 32. This process is repeated continually. As indicated in FIG. 3, approximately every four minutes, the number of tags in the buffer at the location in question is counted, as indicated at 33. If the number of tags is not greater than 32 they are forwarded to a sorting stage 37. Otherwise the tags with good syntax in the buffer are selected, as indicated at 34, then the syntax-checked tags are sorted into tag ID order, as indicated at 35. If the number of tags is >32, then sampling takes place to set the number of tags to equal to 32, as indicated at 36 and then those tags are forwarded to the sorting stage 37. If the number of tags is not >32, then, the tags in the buffer are sorted into time order, as indicated at 37. Irrespective of whether the tags are sampled or not, a transmission message is constructed and sent, as indicated at 38. Following sending of the message, as indicated at 39 the buffer is emptied and approximately 4 minutes elapses before the cycle of FIG. 3 is repeated. Messages containing data representing the readings by the unit 1 are transmitted to a control centre 2 at a remote location. Each unit has its own identification signal included in the messages transmitted. Each message includes the tags (whether sampled or otherwise) for a predetermined reading period, for example 4 minutes, and the time periods in which those readings were made. At the control centre 2, the tags from the unit 1 are compared with the tags read by a second unit 1' and the time period taken for a tag recognised at the second unit to travel from the first unit to the second unit is compared with a reference journey time for the stretch of carriageway between the two units and an average journey time for these tags is calculated. The reference journey time is that for a vehicle to travel between the two units at the threshold between acceptable rate of traffic flow and unacceptable rate of flow. In the event that the detected journey time is greater than the reference journey time a message is transmitted by the control centre 2 and fed to a paging service computer 21 which immediately emits messages which are transmitted via VHF to paging units 3 which may be in respective vehicles. At the control centre 2 is a control operator 18 watching a visual display unit (VDU) 19. As an address/time period differential message arrives at the centre, the address, the time period differential and the time of day (but not the data as to the plate characters, which data for the reason of protection of privacy is not stored after the journey time calculations have been completed) are displayed on the VDU and are logged into a computer data base at the centre 2. The operator 18 maintains a supervisory role. At the control centre 2 and downstream thereof the system corresponds to the disclosure in WO-A-90/05969. The information may be presented by the units 3 either visually or aurally, or both.

Details of the tag constriction, the sampling strategy, the tag time code generation and the message construction now follow.

Tag Construction

Vehicle tags are derived using character recognition in the first instance to interpret the vehicle registration number.

This number is compressed to a 15-bit representation of over 30,000 possible codes.

The method of tag construction is dependent on the syntax of the registration number, and for the United Kingdom assumes that numbers which do not fall into the following formats are sufficiently infrequent that they can be discard:

|  |  |
| --- | --- |
| A123XYZ | XYZ123A |
| A12 XYZ | XYZ 12A |
| A1 XYZ | XYZ 1A |

The tag depends on two properties common to these United Kingdom formats:

Both leading and trailing characters are always letters

The registration always contains a number from one to three digits (1 to 999)

Tags are constructed using the following steps:

a) Discard the leading and trailing letters b) Identify the numeric characters and encode as a number in the range 1 to 999 c) Add 99 to numbers less than 100 to create a number x in the range 100 to 999 d) Categorise each of two remaining letters into one of 6 sub-divisions of the alphabet e) Represent the two letters as codes y and z in the range 0 to 5 depending upon into which subdivision each has been categorised f) Calculate the tag value from $(x-100)*36+(y*6)+z$ The advantages of this method of tag construction are 1) Almost 100% efficient use of 15 bit tag space.

2) Only one and two digit numbers (less than 10% of the total) are overlaid on 3 digit numbers, therefore most 3 digit codes are unique.

3) Leading and trailing characters (which are more frequently damaged and/or dirty, and are more difficult to distinguish from the vertical plate edges) are not used in the calculation.

4) "Year" letters are not used because of their poor statistical distribution.

5) Problems distinguishing between similar letters (e.g. H & N, U & V, E & F) can be reduced by mapping such pairs into the same sub-division of the alphabet.

Sampling Strategy

Sampling decisions are made at the end of the reading period immediately prior transmission, and all possible vehicle tags (in two directions) are collected and retained up to that point. The following information is recorded for each tag:

a) Value of 3-digit number in range 1 to 999 b) Letter group codes for each of the two letters c) Confidence factor c for vehicle ID (identification) based on one or more criteria particularly confidence of each character correlation d) Direction of vehicle (+ve or −ve)

Where j vehicles are recorded in the +ve direction and k in the −ve direction and the total number of tags which can be transmitted is n, the number of tags to be transmitted is determined as follows:

If ((j+k)<=n) then transmit j+ve tags and k−ve tags
Else
  If (j<=n/2) then transmit j+ve tags and (n-j) −ve tags Else
    If (k<=n/2) then transmit (n-k) +ve tags and k −ve tags Else
  Transmit n/2 +ve tages and n/2 −ve tags Underlined quantities above indicate numbers which must be reached through sampling. Where a quantity q is to be sampled to a target number r, a confidence factor threshold t is applied such that q' represents the number of tags for which c>=t. Sampling is then carried out using the following procedure;

If (q'<=r) then discard (q-r) tags starting with the lowest c values
Else
  Discard (q-q') tags starting with the lowest c values and then
  Discard (q'-r) tags starting with the lowest values of 3-digit numbers The confidence factor threshold t is determined empirically, and is selected according to the desired probability of a tag at this confidence level being recognised successfully at a different reading location. If set too high, tags may be discarded which otherwise might have been matched, and if set too low, tags may be transmitted which are unlikely to be matched.

The lowest values of the 3-digit number are discarded since these are "less unique" when subsequently transposed into the range 100–999.

Tag Time Code Generation

To reduce the quantity of message data required to represent a timestamp associated with each tagged vehicle, a time code relative to the intended instant of transmission is used. It is assumed that the transmission delay from location to the remote control centre is small, such that all transmissions are fixed in real time by a timestamp applied at the control centre immediately upon receipt of a message. In this case, clocks at the reading locations do not need to be synchronised.

Assuming a packet transmission interval of 4 minutes (240 seconds), if the time is quantised into 15 second slots, there will be 16 such slots. If locations are at four mile intervals, a worst case uncertainty of 15 seconds at two consecutive locations (30 seconds total) represents a 6.67 mph error in a vehicle speed of 60 mph. However at 30 mph, the 30 second uncertainty applies to a longer time period and the error in vehicle speed is reduced to 1.76 mph. In both cases, the error can be expected to be reduced by averaging over a number of vehicles.

A format to encode the time since the start of the 4 minute period would be to add 4 bits (giving 16 possible slot codes) to each vehicle tag. Therefore, assuming 16 bit tags each vehicle would require 20 bits, e.g.

| T1 | Tag1 | T2 | Tag2 |
| --- | --- | --- | --- |
| 0010 | 1010001000100010 | 0011 | 0000110011001010 |
| T3 | Tag3 | T4 | Tag4 |
| 0011 | 1111000000101011 | 1011 | 0101100010100100 |

For, say, 32 vehicles per transmission, the time information in this case would use a total of 4 bits×32 tags=128 bits of message space.

Alternatively, a variable number of bits could be used to encode differential time between successive vehicles. For example, the following code could be used:

| | |
|---|---|
| 0 | vehicle arrived within the same time slot as the previous vehicle. |
| 10 | vehicle arrived in the next time slot from the previous vehicle. |
| 110 | vehicle arrived in the next but one time slot from the previous vehicle. |
| 1110 | vehicle arrived in the next but two time slot from the previous vehicle. |
| ... | ... |
| 1111111111111110 | vehicle arrived in the next but 14th time slot from the previous vehicle. | i.e.

| T1 | Tag1 | T2 | Tag2 |
|---|---|---|---|
| 110 | 1010001000100010 | 10 | 0000110011001010 |
| T3 | Tag3 | T4 | Tag4 |
| 0 | 1111000000101011 | 11110 | 0101100010100100 |

The worst case is when the last tag transmitted is from the last time slot, in which case the total number of '1's used to encode the differential time is equal to one less than the number of available time slots. There will always be the same number of '0's as there are tags, as there is one '0' in the differential time code for each tag. Therefore the maximum total number of bits used to encode differential time is:

Number of time slots+Number of Tags−1

For example, for 16 time slots and 32 tags the worst case number of time code bits is 47, which represents a saving of 81 bits over the technique described above.

4. Message Construction

Vehicle tag messages are transmitted at, say, four minute intervals. Such messages will be constructed as follows:

[Location ID] [Tag1] [Tag2] [Tag3] . . . [Tag n]

Location ID: Space allowing identification of location transmitter

Tag n: Field having three components:

15 bit vehicle ID 1 bit vehicle direction (0=+ve, 1=−ve)

Vehicle relative time slot variable length code)

The tag construction and sampling strategy may vary considerably from country to country, although, for example, in the State of Minnesota, United States of America, licence plates commonly comprise three letters and three numerals.

Four principal benefits are obtained by the preferred embodiment, namely

1. A low cost hardware platform can be used, therefore facilitating extension of the system over a large geographical area at a low cost, since the monitoring units are installed only every 6.5 kilometers (4 miles) or so.

2. The communication cost is relatively low because the amount of data to be handled is moderate since the whole of the registration plate is not reported. Either the data can be matched between adjacent reading locations or entire data from every location can be brought back to the central control and matched on a central computer, enabling accurate journey time measurement for traffic over short and long distances to be achieved.

3. The fact that the entire plate is not reported has a very substantial social and political benefit as there can be no fears about illicit use of the information for other purposes.

4. It is applicable to obtaining information as to traffic congestion and distribution over a road or network of roads of virtually any class, and can be useful in early detection of road incidents, particularly accidents. It also provides accurate measurement of average journey times in a road network for road network management purposes, or for use in in-vehicle navigation systems.

What is claimed is:

1. A method of monitoring traffic flow, comprising reading registration plates of the vehicles of a first series of vehicles passing a first location along a road, selecting a sample of readings from the readings relating to the respective vehicles of the series, reading the registration plates of the vehicles of a second series of vehicles passing a second location along said road, and determining whether readings of said sample are deemed to be present in the readings relating to the respective vehicles of said second series.

2. A method according to claim 1, wherein said selecting of said sample is performed according to an algorithm.

3. A method according to claim 2, and further comprising selecting, according to said algorithm, a second sample of readings from the readings relating to the respective vehicles of said second series, said determining comprising determining whether said readings of the first-mentioned sample are deemed to be present in the readings of said second sample.

4. A method according to claim 2, wherein said algorithm comprises the step of excluding readings below a confidence factor threshold.

5. A method according to claim 1, in which characters between the leading character and the trailing character of each registration plate are reported prior to said selecting, but the leading character and/or the trailing character is/are not reported.

6. A method according to claim 5, in which all of the characters of each registration plate are read prior to the reporting.

7. A method according to claim 1, in which characters of each plate having a statistical distribution more even than at least another character of the plate are reported prior to said selecting and the or each said other character is not reported.

8. A method according to claim 7, wherein the or each said other character is a dating character.

9. A method according to claim 7, wherein the or each said other character is a geographically locating character.

10. A method according to claim 1, wherein said reading comprises reading a character of each plate, and reporting prior to said selecting each such character as being one of a restricted group of characters.

11. A method according to claim 10, wherein said restricted group of characters is one of a plurality of restricted groups of characters, the characters whereof differ from group-to-group and from character-to-character in each group.

12. A method according to claim 11, wherein the characters of the restricted groups are letters of the alphabet.

13. A method according to claim 12, wherein said groups of characters comprise respectively:

LBSQ

EFPAR

IJKX

CODGU

NZHM

VWTY.

14. A method according to claim 1, and further comprising entering the readings obtained from the or each series of vehicles each into an appropriate time period of a sequence of time periods and emitting a signal representing readings relating to vehicles of that series which signal comprises codes representing time period differences among readings.

15. A method according to claim 1, wherein said road is part of a road network and said first and second locations are of a multiplicity of locations distributed over said network and said method further comprises reading the registration plates of the vehicles of further series of vehicles passing the locations additional to the first and second locations and determining whether readings of the sample(s) are deemed to be present in the readings relating to the vehicles of the further series.

16. A method according to claim 1, wherein the selecting of the sample(s) takes place at the corresponding location(s) and said determining takes place at a control centre remote from the first and second locations.

17. A method according to claim 1, wherein data obtained by said determining is utilised to indicate average vehicle speed between said first and second locations.

18. A method according to claim 17, wherein the indication of said vehicle average speed is presented in vehicles.

19. A system for monitoring traffic flow, comprising first reading means serving to read registration plates of the vehicles of a first series of vehicles passing a first location along a road, second reading means serving to read registration plates of the vehicles of a second series of vehicles passing a second location along said road, and selecting and determining means serving to select a sample of readings from the readings relating to the respective vehicles of said first series and serving to determine whether readings of said sample are deemed to be present in the readings relating to the respective vehicles of said second series.

20. A system according to claim 19, and wherein said selecting means serves to select said sample according to an algorithm and wherein said system further comprises second selecting means, serving to select, according to said algorithm, a second sample of readings from the readings relating to the respective vehicles of said second series, and wherein said determining means serves to determine whether said readings of the first-mentioned sample are deemed to be present in the readings of said second sample.

21. A system according to claim 19, wherein said road is part of a road network and said first and second locations are of a multiplicity of locations distributed over said network and said system further comprises further reading means serving to read the registration plates of the vehicles of further series of vehicles passing the locations additional to the first and second locations and said determining means serves also to determine whether readings of the sample(s) are deemed to be present in the readings relating to the vehicles of the further series.

22. A system according to claim 19, wherein the selecting means is disposed at the corresponding location(s) and said determining means is disposed at a control centre remote from the first and second locations.

23. A system according to claim 19, and further comprising utilising means serving to utilise data obtained by said determining means to indicate average vehicle speed between said first and second locations.

24. A system according to claim 23, and further comprising presenting means in vehicles and serving to present therein said vehicle average speed.

* * * * *